United States Patent [19]
Cioffi

[11] Patent Number: 5,673,290
[45] Date of Patent: *Sep. 30, 1997

[54] ADSL COMPATIBLE DISCRETE MULTI-TONE APPARATUS

[75] Inventor: John Cioffi, Cupertino, Calif.

[73] Assignee: Amati Communications Corporation, San Jose, Calif.

[*] Notice: The term of this patent shall not extend beyond the expiration date of Pat. No. 5,519,731.

[21] Appl. No.: 485,780

[22] Filed: Jun. 7, 1995

Related U.S. Application Data

[63] Continuation-in-part of Ser. No. 227,778, Apr. 14, 1994, Pat. No. 5,519,731.

[51] Int. Cl.$^6$ .................................................. H04K 1/10
[52] U.S. Cl. .......................... 375/260; 375/240; 375/285; 375/296; 375/340; 375/346; 370/210; 370/465; 370/477
[58] Field of Search ............................ 375/240, 259, 375/260, 285, 295, 296, 316, 340, 348, 349, 346; 370/6, 70, 71, 94.1, 118, 210, 465, 477; 455/266; 379/93, 97; 348/388, 398, 436

[56] References Cited

U.S. PATENT DOCUMENTS

| | | | |
|---|---|---|---|
| 4,438,511 | 3/1984 | Baran | 370/19 |
| 4,731,816 | 3/1988 | Hughes-Hartogs | 379/98 |
| 4,757,495 | 7/1988 | Decker et al. | 370/76 |
| 4,980,897 | 12/1990 | Decker et al. | 375/38 |
| 5,285,474 | 2/1994 | Chow et al. | 375/13 |
| 5,313,467 | 5/1994 | Varghese et al. | 370/94.1 |
| 5,479,447 | 12/1995 | Chow et al. | 375/260 |
| 5,519,731 | 5/1996 | Cioffi | 375/260 |
| 5,557,612 | 9/1996 | Bingham | 370/71 |

*Primary Examiner*—Stephen Chin
*Assistant Examiner*—Amanda T. Le
*Attorney, Agent, or Firm*—Hickman Beyer & Weaver, LLP

[57] ABSTRACT

An improved discrete multi-tone transmission scheme is describe that contemplates encoding digital data and modulating the encoded data onto a discrete multi-tone signal having a total bandwidth of at least 1.6 MHz. In some embodiments bandwidths of 8 MHz or more are provided. The modulation system is capable of dynamically updating the subcarriers used and the amount of data transmitted on each subcarrier during transmission in order to accommodate real time changes in the line quality over particular subcarriers. In one preferred embodiment of the invention the multi-tone encoding and modulation is done in substantial compliance with the ATIS North American Asymmetric Digital Subscriber Lines standard. However, additional subchannels (such as a total of 512 subchannels) may be used and/or subchannel bandwidths of greater than 4.3125 kHz may be used. In this system, the subchannels that occur at frequencies above those set forth in the standard are treated similarly to those within the standard range in terms of subcarrier selection criteria. The described system permits transmission of digital data at transmission rates of six to 55 Mbps over twisted pair telephone lines at distances of 1200 meters even on lines that experience significant crosstalk noise such as T1 or E1. In another application, the invention may be used with ordinary telephone lines such as twisted pair lines to transmit data to remote receivers located up to 2000 meters from the transmitter at digital data transmission rates of at least ten to fifty million bits per second (10–50+ Mbps). With such an arrangement, the bandwidth available for upstream communications may also be increased.

20 Claims, 8 Drawing Sheets

5,673,290

ADSL COMPATIBLE DISCRETE MULTI-TONE APPARATUS

BACKGROUND OF THE INVENTION

This application is a Continuation-in-Part of application Ser. No.: 08/227,778 filed on Apr. 14, 1994, now U.S. Pat. No. 5,519,731 which is incorporated herein by reference.

The present invention relates generally to systems for the transmission and reception of multi-carrier, high speed data signals. More particularly, a discrete multi-tone (DMT) system having a widened bandwidth is described.

At the time of this writing, the Alliance For Telecommunications Information Solutions (ATIS), which is group accredited by the ANSI (American National Standard Institute) Standard Group, has finalized a standard for the transmission of digital data over Asymmetric Digital Subscriber Lines (ADSL). The standard is intended primarily for transmitting video data over ordinary telephone lines, although it may be used in a variety of other applications as well. The standard is based on a discrete multi-tone transmission system. Transmission rates are intended to facilitate the transmission of information at rates of at least 6 million bits per second (i.e., 6+ Mbps) over ordinary phones lines, including twisted-pair phone lines. The standardized discrete multi-tone (DMT) system uses 256 "tones" that are each 4.3125 kHz wide in the forward (downstream) direction. That is, in the context of a phone system, from the central office (typically owned by the telephone company) to a remote location that may be an end-user (i.e., a residence or business user).

The Asymmetric Digital Subscriber Lines standard also contemplates the use of a duplexed reverse signal at a data rate of at least 608 Kbps. That is, transmission in an upstream direction, as for example, from the remote location to the central office. Thus, the term Asymmetric Digital Subscriber Line comes from the fact that the data transmission rate is substantially higher in the forward direction than in the reverse direction. This is particularly useful in systems that are intended to transmit video programming or video conferencing information to a remote location over the telephone lines. By way of example, one potential use for the system allows residential customers to obtain video information such as movies over the telephone lines rather than having to rent video cassettes. Another potential use is in video conferencing.

As is well known to those familiar with the Asymmetric Digital Subscriber Lines standardization process, as well as telephone systems generally, most telephone systems are divided into a multiplicity of carrier service areas that have a desired maximum carrier service area (CSA) range. In the U.S., maximum carrier service area ranges of 2 miles from a "central office" are typical when 24-gauge twisted pair wiring is used and 9000 feet is typical when 26-gauge wiring is used. Thus, one of the important features in the standardization process was that the selected system be capable of being transmitted throughout a CSA range from a central office over ordinary twisted-pair phone lines such as 24-gauge twisted pair phone lines. This requires both that the signal does not attenuate an unreasonably high amount and that it be relatively tolerant of crosstalk noise.

One acknowledged drawback of the discrete multi-tone solution for the Asymmetric Digital Subscriber Line standard is that when T1 crosstalk noise is present in the same binder or an adjacent binder, the transmission scheme has difficulty reaching the outer limits of the prescribed range with reliable signals. For example, T1 circuits generally carry 24 voice channels at a data rate of approximately 1.544 million bits per second and are generally known to create a significant amount of crosstalk noise. In fact, the presence of T1 noise will generally cut the range of a digital multi-tone signal to less than the CSA range given the desired power limitations and permissible bit error rates. Accordingly, it appears that special provisioning may be required to ensure complete carrier servicing area coverage in all cases. Although the types of telephone systems that experience T1 noise are quite low on a percentage basis, it is widely perceived as being important to have 100 percent compatibility in any standardized service. It would, of course, have been desirable to guarantee complete carrier service area coverage with a standardized technology. However, it was widely believed that such a range was impossible given the nature of the discrete multi-tone technology. The present invention is believed to be one solution to the crosstalk noise problem. The described solution is equally applicable to phone systems that experience E1 noise (which are primarily located outside of North America), although the problem is more pronounced in areas that experience T1 crosstalk noise.

The present invention also provides a solution that has numerous advantages well beyond the mitigation of crosstalk noise problems. For example, in areas which are not susceptible to T1 or E1 crosstalk noise (which is the vast majority of the installed telephone system base), the described invention permits reliable transmission of digital information at rates of 10–50 Mbps per second or greater over installed lines. The system also permits a provision for higher speed transmissions in the upstream direction. As will be appreciated by those skilled in the art, these transmission rates are substantially greater than those that are currently obtainable.

SUMMARY OF THE INVENTION

In view of the foregoing, it is an object of the present invention to provide a method of transmitting digital information from a source over a potentially noisy subscriber communication line using a discrete multi-tone transmission scheme. The system contemplates encoding digital data and modulating the encoded data onto a discrete multi-tone signal having a total bandwidth of at least 1.6 MHz. In some embodiments, bandwidth of more than 8 MHz are used. The communication line is monitored to determine at least one line quality parameter including noise levels at each of a multiplicity of subchannels that each correspond to an associated subcarrier tone. The modulation scheme is arranged to take into consideration various factors including the detected line quality parameters, subchannel gain parameters, and a permissible power mask parameter when modulating the discrete multi-tone signal. The modulation system is also capable of dynamically updating the subcarriers used and the amount of data transmitted on each subcarrier during transmission to accommodate real time changes in the line quality over particular subcarriers. A receiver located at a remote location relative to the transmitter is arranged to receive, demodulate and decode the discrete multi-tone signal.

In one embodiment of the invention the multi-tone encoding is done in substantial compliance with the ATIS Asymmetric Digital Subscriber Lines standard although a total of 512 subchannels each having a bandwidth of approximately 4.3125 kHz are used. In this embodiment, the subchannels that occur at frequencies above those set forth in the standard are treated similarly to those within the standard range in terms of subcarrier selection criteria. This embodiment contemplates the use of a discrete multi-tone signal having an available bandwidth of 2.208 MHz. In other embodiments, the number of subchannels may range between 128 and 2048 or more.

In some embodiments, the bandwidth of each of the subchannels is increased to facilitate a greater total bandwidth than 4.3125 kHz wide subchannels would provide. By way of example, the bandwidth of each subchannel may be in the range of 5-40 kHz wide or more. One described embodiment contemplates the availability of 256 subchannels each having a bandwidth of 34.5 MHz, for a total available bandwidth of 8.832 MHz. In applications that are susceptible to interference from known regulated sources such as amateur radio signals, the bands associated with the interference may simply be masked and silenced to prevent interference in either direction.

In other applications of the invention, it may be used in systems that experience significant crosstalk noise. In such systems, the signals are transmitted over subcarriers having frequencies above and below the most significant crosstalk noise (such as T1 crosstalk noise) to facilitate transmission of the encoded digital data throughout a carrier service area at a data transmission rate of at least six million bits per second (6 Mbps).

In another application of the invention, it may be used with ordinary telephone lines such as twisted pair lines to transmit data to remote receivers located up to 2000 meters from the transmitter at digital data transmission rates of at least ten million bits per second (10 Mbps). Indeed data transmission rates of in excess of 25 Mbps at distances of 1000 meters and 50 Mbps at distances of 600 meters of twisted pair lines are readily obtainable.

In another application of the invention, additional bandwidth may be made available for upstream communications to permit upstream communication at any desired data rate.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE INVENTION

Figure 1:
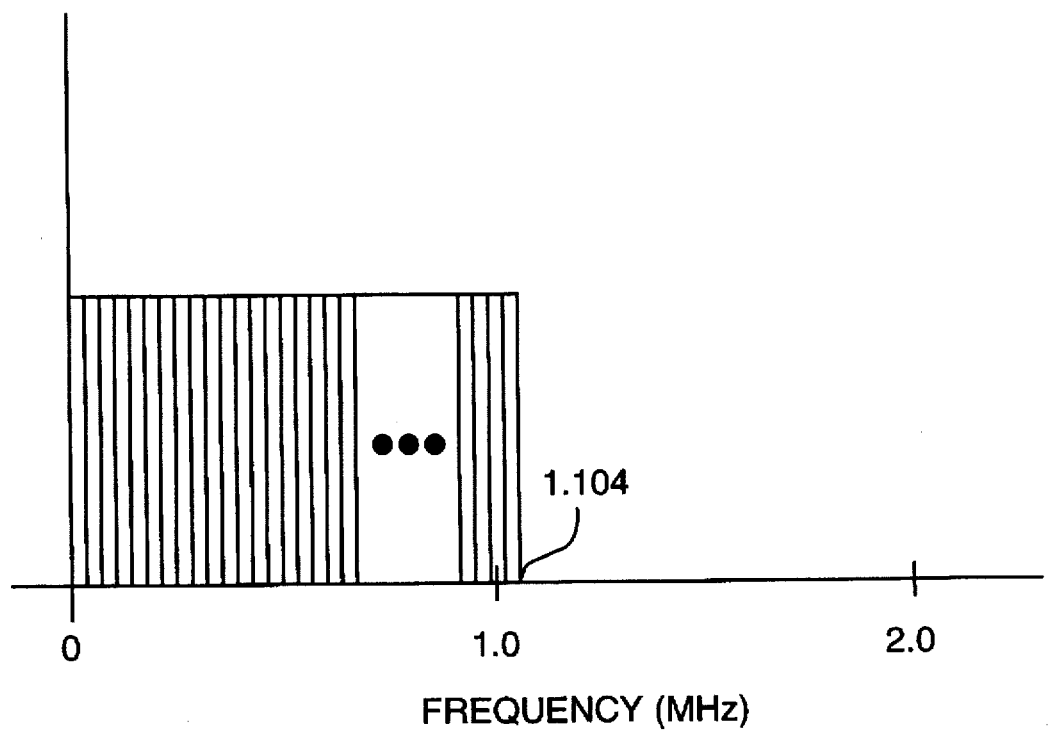
FIG. 1 is a graph illustrating a discrete multi-tone transmission band in accordance with the ATIS North American Standard.

The presently accepted ATIS Asymmetric Digital Subscriber Line North American standard contemplates use of a Discrete Multi-Tone (DMT) data transmission scheme. A detailed description of the protocols for the Discrete Multi-Tone transmission scheme is described in detail in the pending North American Standard, which is referred to as the T1E1.4 ATIS Standard, and is presently set forth in Standard Contribution No. 94-007, rev. 8, dated March of 1995 and is incorporated by reference in its entirety. As illustrated in FIG. 1, the standardized discrete multi-tone (DMT) system in North America uses 256 "tones" that are each 4.3125 kHz wide in the forward (downstream) direction. The frequency range of the tones is from zero to 1.104 MHz. The lower 32 tones may also be used for duplexed data transmission in the upstream direction. As described in the background section of the application, one acknowledged limitation of the discrete multi-tone transmission system that has generally been construed as insolvable is reliable carrier service area signal transmission in the presence of T1 crosstalk noise.

The solution proposed herein significantly increases the transmission bandwidth. In one example, the bandwidth increase is achieved by increasing the number of subchannels, with each subchannel having the same width. In another example, the bandwidth increase is achieved by increasing the bandwidth of each subchannel. That is, instead of the 256 subchannel 1.104 MHz bandwidth set forth in the proposed standard (which is shown in FIG. 1), a system having on the order of two to ten times that bandwidth is proposed. By way of example, in one embodiment, the transmission bandwidth is doubled by providing 512 subchannels each having a 4.3125 kHz width to provide a total 2.208 MHz bandwidth. In another embodiment, eight times as many 4.3125 kHz wide subchannels are used to provide an 8.832 MHz bandwidth. When desired, the number of subchannels (and therefore the bandwidth) available for upstream transmissions may also be increased. The bandwidth allocated to upstream transmission may be widely varied to meet the needs of any particular application. By way of example, the number of subchannels available for upstream communications may be doubled to 64 tones from the 32 tone bandwidth suggested in the ATIS standard.

Another approach contemplates allocating more bandwidth to each subchannel. By way of example, increasing the bandwidth of each subchannel by a factor in the range of two to ten has been found to work well. Thus, in a 256 subchannel system, with a bandwidth of 34.5 kHz per "tone", an 8,832 MHz total transmission bandwidth is provided. Of course, the subchannel-number-increasing and tone-width-increasing concepts can be used either separately or together to provide the required bandwidth for any particular system.

As will be appreciated by those skilled in the art, there is a significant installed base of ATM equipment that is set up for standardized transmission rates of 25.6 MBits/sec and/or 51.84 MBits/sec. Such data rates can readily be delivered directly to the end user over many installed twisted pair phone lines using a discrete multi-tone system in accordance with the present invention having an 8.832 MHz transmission bandwidth.

In practice, given a particular bandwidth, higher data transmission rates are generally obtainable when more subchannels are used. However, more subchannels generally translate to higher hardware costs. In contrast, expanding subchannel bandwidth tends to be a lower cost solution that has slightly lower maximum data transmission rates.

Figure 2:
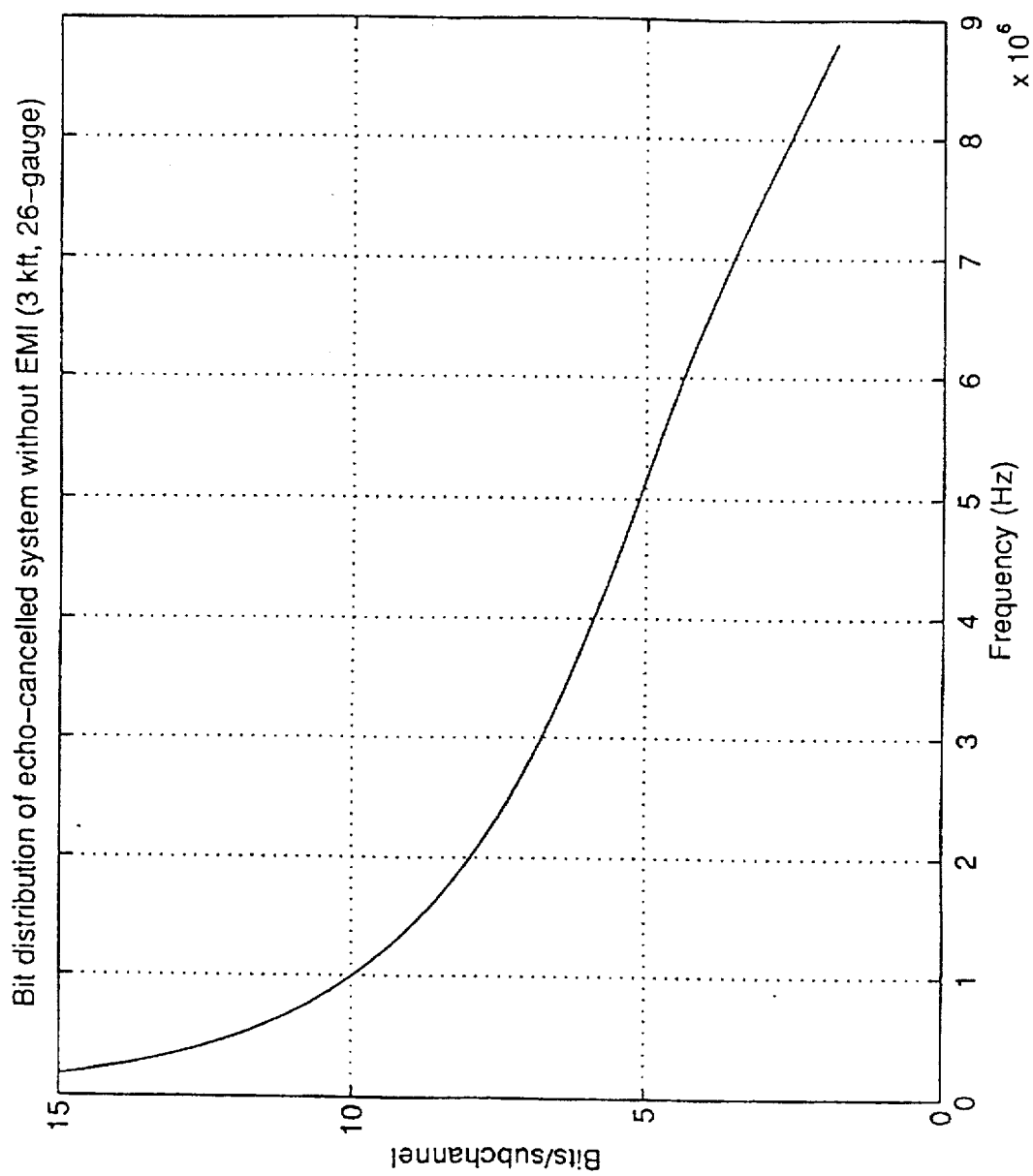
FIG. 2 is a graph illustrating a representative bit distribution profile which shows the number of bits carried on each tone for a one kilometer 26-gauge phone line with worst-case crosstalk.

As will be appreciated by those skilled in the art, it has been widely believed that transmissions at frequencies substantially above the 1.1 MHz range (as for example above 1.3 MHz) would not be suitable for transmission over relatively long distances on twisted pair phone lines. However, Applicant's experiments in the area have shown that this is not the case. Rather, transmissions under the discrete multi-tone protocol have been found to work well in the frequency range of one to ten megahertz and above as well. By way of example, FIG. 2 is a graph illustrating a representative bit distribution profile for a 25.6 Mbit/sec transmission system that does not include echo canceling. The embodiment shown shows the number of bits carried on each tone for a one kilometer 26-gauge phone line with worst-case crosstalk. The margins in this case are approximately 12.4 decibels, which is well above the margins that are generally considered necessary for digital data transmission (minimum margins of about 6 decibels are typical.) As can be seen in the graph, there is significant data transmission at frequencies above 1.1 MHz.

Figure 3:
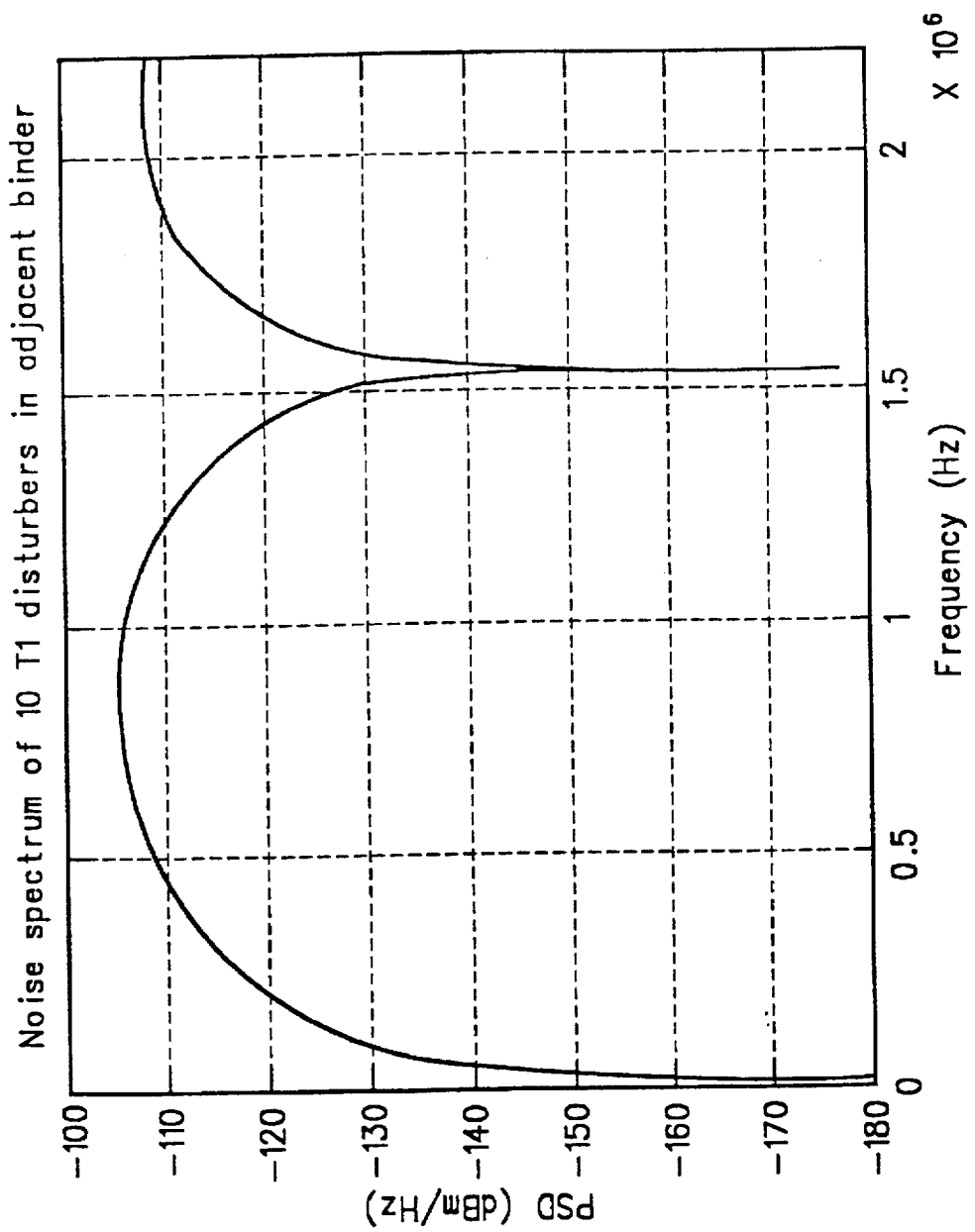
FIG. 3 is a graph illustrating the frequency spectrum of ordinary T1 noise.

Referring next to FIG. 3, the described system's usefulness in carrier service areas that experience T1 noise will be described. As seen therein, T1 noise is not a very big factor at relatively low frequencies (as for example at frequencies below about 600 kHz). However, the magnitude of its interference (crosstalk) increases as the frequency increases until it exceeds a level that is acceptable for discrete multi-tone transmission to locations over a mile from a central office. Thus, it is generally agreed that discrete multi-tone transmissions can not be reliably used in subchannels having frequencies above about 600-750 kHz in carrier service areas that experience T1 noise. This is particularly true when the remote locations are located more than about a mile from the source. Thus, T1 noise significantly limits the number of subchannels that are available for data transmission in the forward direction, which severely limits the speed at which digital data can be transmitted as is illustrated by the graph shown in FIG. 4. However, as seen in FIG. 3, at frequencies above approximately 1.3 MHz, the amount of crosstalk generated by T1 noise begins to decline rather significantly. A second hump in the T1 noise curve begins to become significant above about 1.6 MHz. Therefore, subchannels in the range of about 1.3 to 1.6 MHz tend to be relatively immune from T1 cross talk noise. Accordingly, when the broader 512 subchannel bandwidth described above is used, 6 Mbps data transmission rates can be readily achieved even in the presence of significant T1 crosstalk noise in an adjacent (or even the same) binder.

As will be appreciated by those skilled in the art, this overcomes one of the most frequent criticisms of the discrete multi-tone transmission standard for Asymmetric Digital Subscriber Line service in North America. It should be appreciated that the actual transmission bandwidths may vary a great deal from transmission to transmission depending on the noise experienced and the data transmission requirements at any given time. However, it appears that in the presence of T1 noise, most of the data transmissions will occur in the bands between about 50 and 600 kHz and about 1.3 to 1.6 MHz. Since the transmissions are made primarily at frequencies that do not conflict with T1 transmissions, using this higher frequency band has the side benefit of not inducing as much noise on surrounding lines.

Figure 4:
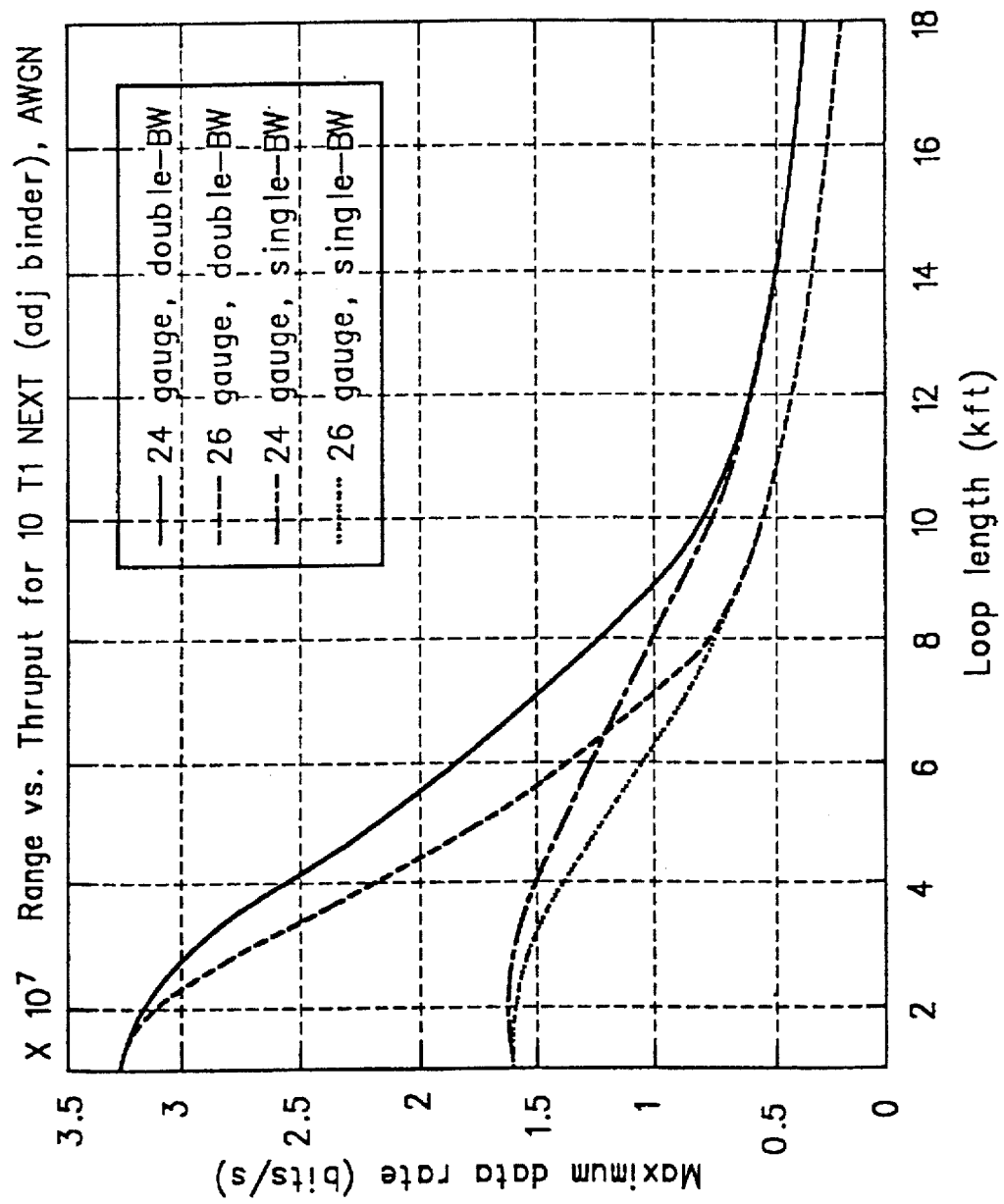
FIG. 4 is a graph contrasting the data rates achievable by the described invention with the data rates achievable by discrete multi-tone transmitters that operate in accordance with the ATIS North American Standard for Asymmetric Digital Subscriber lines in the presence of T1 crosstalk in an adjacent binder for both 26 and 24-gauge twisted pair wires over varying distances.

The data rates that are achievable by discrete multi-tone transmitters that operate in accordance with the described subchannel doubling embodiment of invention will be described with reference to FIG. 4. FIG. 4 is a graph comparing the double bandwidth embodiment with those that operate in compliance with the ATIS Noah American Standard for Asymmetric Digital Subscriber lines in the presence of T1 crosstalk in an adjacent binder for both 26 and 24-gauge twisted pair wires over varying distances. As can be seen therein, the described invention has significantly improved data transmission rates in the presence of T1 noise.

The preceding description has illustrated the application of the invention in a system which experience significant T1 crosstalk noise. However, it should be appreciated that the described system works equally well to avoid higher order T1 noise, E1 crosstalk noise (which is more common in European countries and tends to be most pronounced in the 800 to 1700 MHz range), amateur radio interference (which occupies several narrow bands between 2 MHz and 30 MHz) and any other noise, whether it be institutional or local. In effect, the described discrete multi-tone system simply avoids the frequency bands where noise and/or interference are a problem. This has the duel benefits of not compromising the system's own transmissions by using the noisy subchannels and not interfering with other approved frequency bands that may fall within the broad range of frequencies available to the transmission medium.

Figure 7:
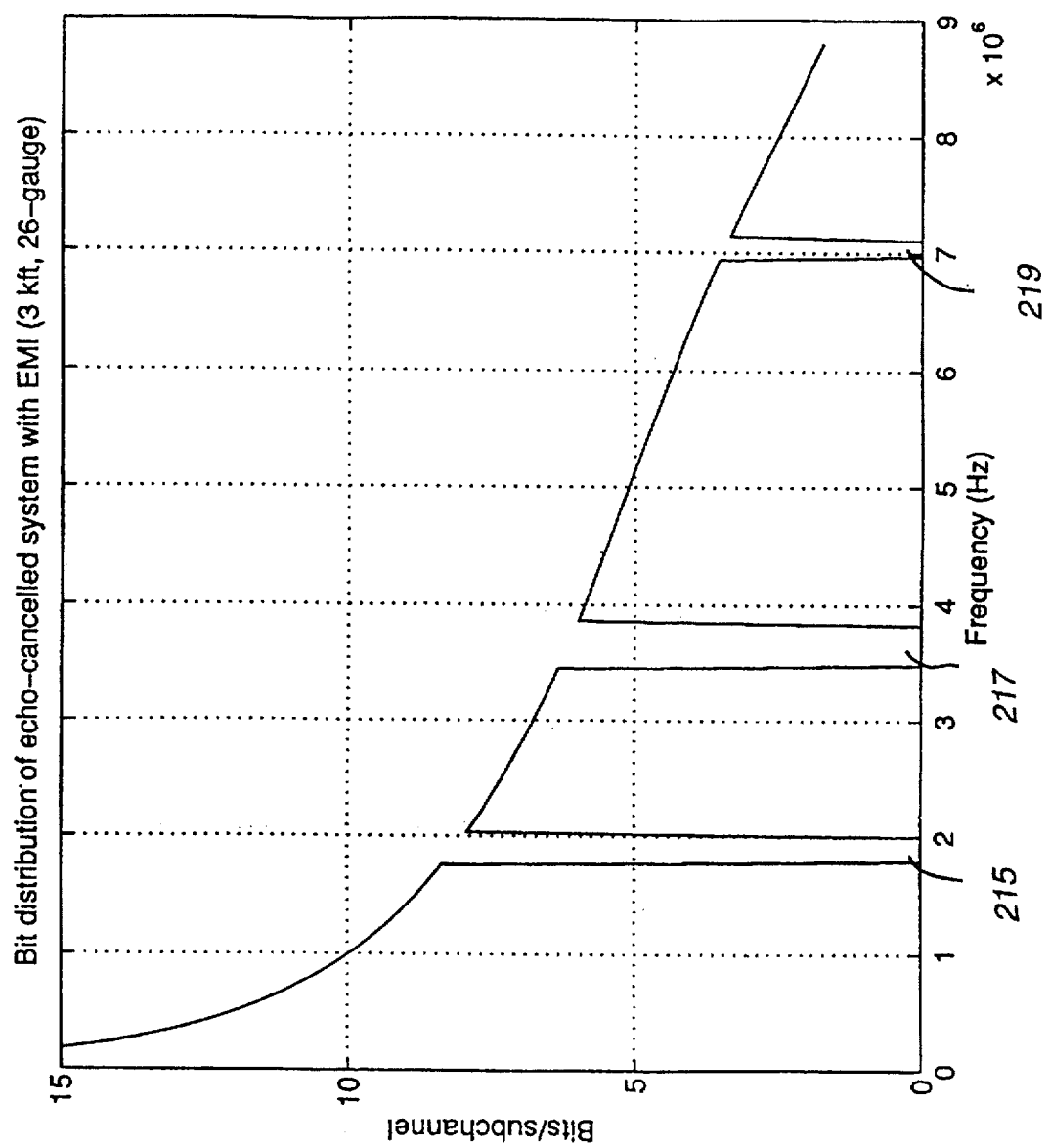
FIG. 7 is a graph illustrating the representative bit distribution profile of FIG. 2 amended to mask potential amateur radio bands.

By way of example, application of the invention in a system that co-exists with amateur radio broadcasts will be described. FIG. 7 illustrates the representative bit rate distributions for a discrete multi-tone system described above with reference to FIG. 2 with the frequency bands that correspond to amateur radio transmissions are simply masked out. That is, in the embodiment shown, three narrow bands 215,217 and 219 are simply masked so that the discrete multi-tone system does not transmit in the masked frequency ranged. It should be appreciated that the masking does not significantly alter the system's data transmission capabilities. In the embodiment shown, the masked bands include the 1.81 to 2.0; 3.5 to 3.8 and 7.0 to 7.1 MHz frequency bands. The same 25.6 Mbit/sec data transmission rate is obtainable with a drop of only approximately one decibel in the margins when compared to the system described above with reference to FIG. 2. Such margins are well above the 6 decibel margin generally considered necessary for such data transmission systems.

The described arrangement has several other advantages as well. Most notably, in systems that do not experience crosstalk noise (which is the vast majority of the installed telephone base in North America) significantly higher data transmission rates can be reliably achieved. By way of example, in the bandwidth doubling example presented above, data rates of at least 12 Mbps can be reliably obtained at distances over 6000 feet on twisted pair subscriber lines. Further, when the number of subchannels available for transmission in the reverse direction are also doubled, the potential data transmission rate in the reverse direction can also be significantly improved. By way of example, transmission rate of at least 1.544 Mbps (i.e. the T1 data transmission rate) are readily obtainable.

As will be appreciated by those skilled in the art, the data transfer rates that are obtainable by any given system are a function of a number of variables. Some of the relevant variables include the distance that the signals must travel over the transmission lines, the nature of the transmission lines, the margins required, the transmitter power level, and the attendant noise. Thus, systems where the signals have generally shorter distances to travel over higher quality wires with less noise will generally be able to handle higher data transmission rates. On the other hand, systems that must accommodate longer transmission over higher gauge twisted pair wiring with more noise will generally be limited to relatively lower data transmission rates.

In a system that does not employ echo canceling and therefore utilizes the lower frequencies to facilitate upstream communications, data transfer rates of 25 Mbps or more are readily obtainable over twisted pair wires at distances of 1000 meters from the source. For example, a system which transmits 25.6 Mbps over 24-gauge twisted pair wires and preserves a 6 decibel margin requires about 15 dbm transmitter power to attain a 1000 meter range. In echo canceled systems, data transfer rates of 50 Mbps or more are readily obtainable over twisted pair wires at distances of 600 meters from the source. By way of example, a system which transmits 51.84 Mbps over 24-gauge twisted pair wires and preserves a 6 decibel margin requires about 15 dbm transmitter power to attain a 600 meter range. As discussed above, the actual transmission rate capabilities will vary a tremendous amount based upon the characteristics of a particular system. However, it should be apparent to those skilled in the art that the described system permits the delivery of digital data over existing telephone based infrastructure at significantly higher transmission rates than existing technology.

Figure 6:
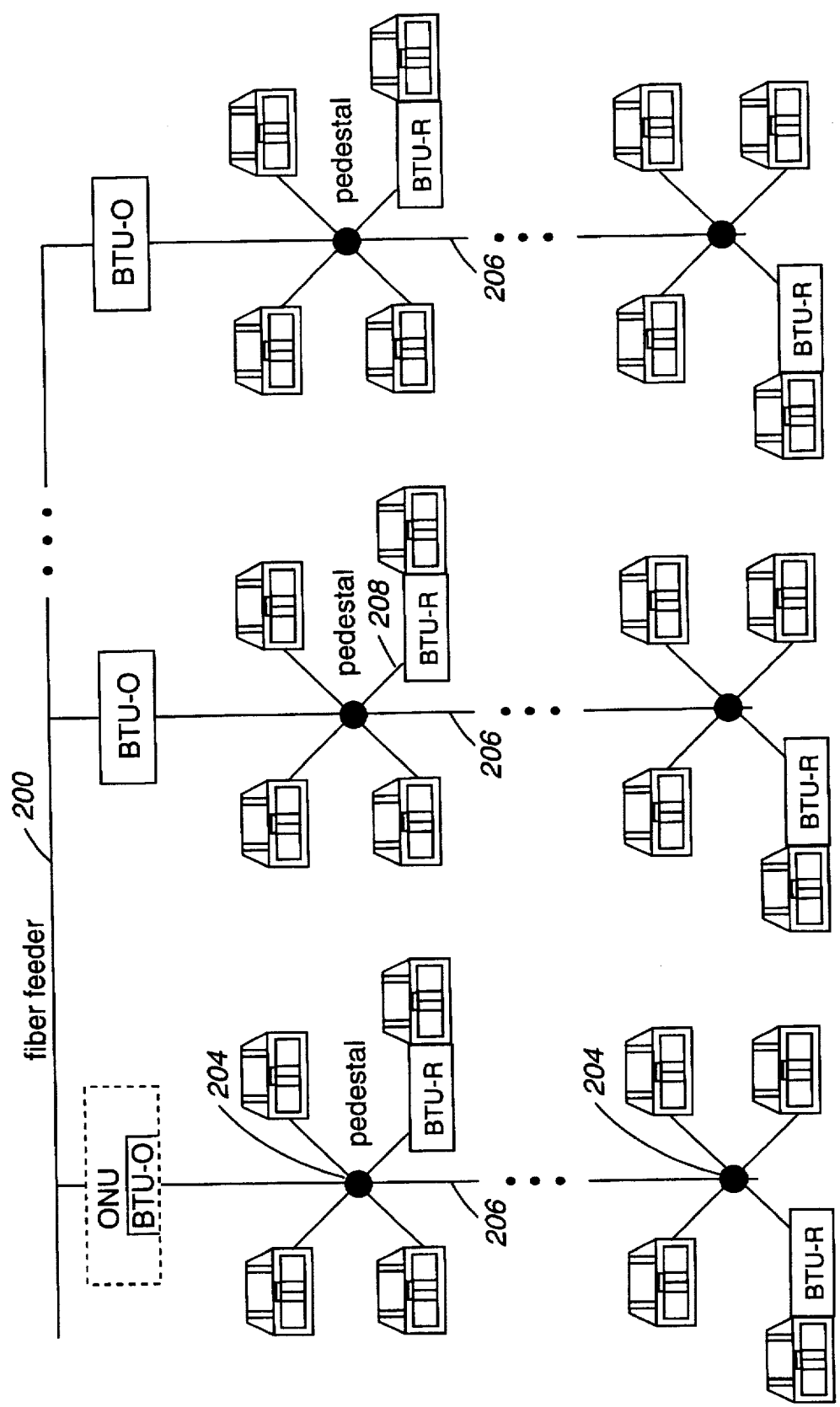
FIG. 6 is a diagrammatic illustration of a distribution area architecture used in many installed phone systems.

In order to better illustrate the capabilities of the described invention, its application in the environment of another existing telephone system architecture that utilizes fiber optic feed lines will be described. One such architecture is illustrated in FIG. 6. In this architecture, an optical fiber feed 200 is arranged to service a multiplicity of optical network units 202. Each optical network unit is coupled to a multiplicity of pedestals 204 by a twisted pair distribution line 206 that may be up to about 1500 meters long. Each pedestal has the potential to service a number of drops 208 which may be made to a residential unit, a business, etc. Often, the drops 208 are formed from twisted pair wiring are typically not much more than about 50 meters long. Thus, it should be appreciated that the invention can be used to provide significantly improved data transmission rates using existing infrastructure.

Figure 5:
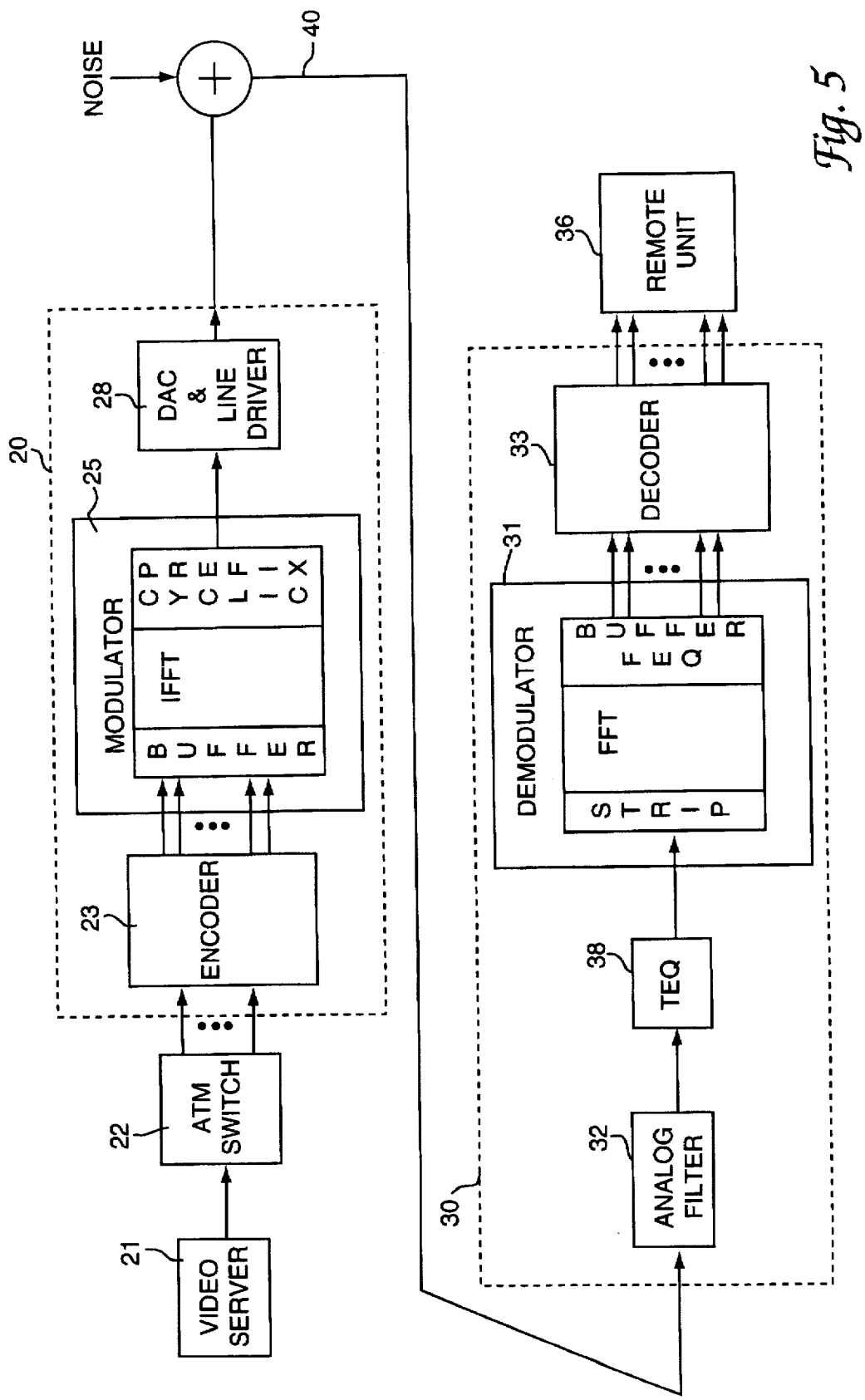
FIG. 5 is a block diagram of a video delivery system that utilizes a discrete multi-tone transmission scheme suitable for implementing the ATIS Asymmetric Digital Subscriber Line standard as well as the present invention.

Referring next to FIG. 5 a video delivery system that operates in accordance with the present invention will be described. A video server 21 provides digital data to transmitter 20 through an asynchronous transfer modem switch 22. The video server 21 can provide data at any data rate up to the maximum data rate permitted in view of the transmission distance, the line quality and type of communication lines used. The transmitter 20 incorporates several components including an encoder 23 and a discrete multi-tone modulator 25. The encoder 23 serves to multiplex, synchronize, encode and compress the video data and is capable of handling data rates of up to 15 million bits per second. More specifically, it translates incoming bit streams into in phase, in quadrature components for each of a multiplicity of subchannels. The encoding may be done using forward error correction and/or trellis coding. In the embodiment shown, 512 subchannels are available. Therefore, the encoder outputs 512 subsymbols sequences that each represent 4 Kbps. These inputs are complex inputs that are passed to a discrete multi-tone modulator 25. By way of example, a suitable encoder is described in detail in the above referenced ATIS standard.

Figure 8:
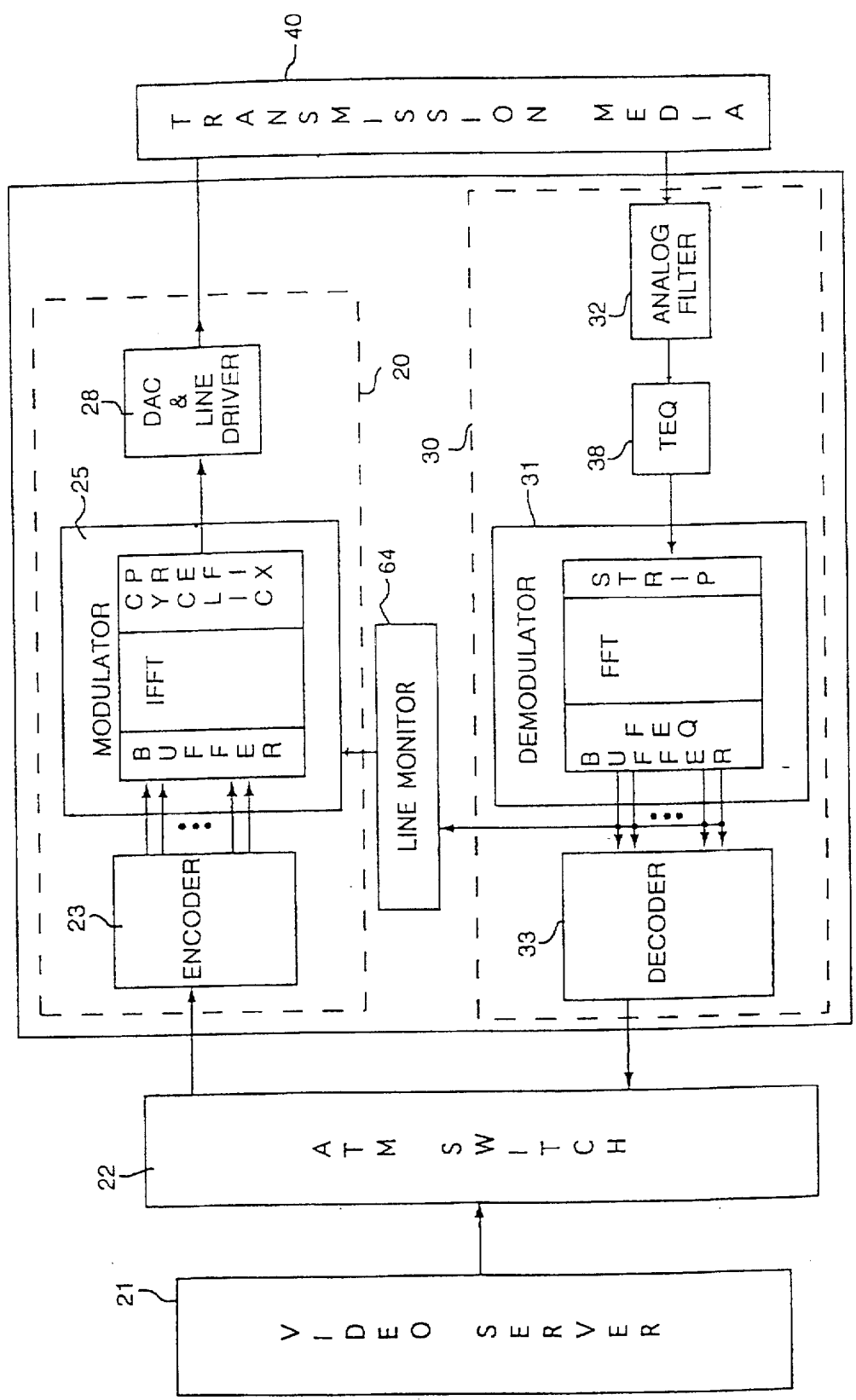
FIG. 8 is a diagrammatic block diagram of a transceiver suitable for implementing the present invention.

The modulator 25 is an IFFT modulator that computes the inverse Fourier transform by any suitable algorithm. Since the encoder outputs are complex numbers, the IFFT modulator receives 1024 inputs. The bit distribution is determined adaptively in discrete multi-tone systems as described in the referenced ATIS standard. To facilitate this, the transmitter 20 also includes a line monitor 64 (see FIG. 8) that monitors the communication line to determine the line quality of each of the available subchannels. In one embodiment, the line monitor 64 determines the noise level, signal gain and phase shift on each of the subchannels. The object is to estimate the signal to noise ratio for each of the subchannels. Therefore, other parameters could be monitored as well or in place of the parameters described. The determination of what subchannels to transmit the encoded data over as well as how much data to transmit over each subchannel is dynamically determined on the basis of several factors. The factors include the detected line quality parameters, subchannel gain parameters, a permissible power mask, and the desired maximum subcarrier bit-error rates. It is noted that the various factors need not be constant between subchannels and indeed may even vary during use. Most notably the line quality parameters are continually checked and adjustments in the modulation scheme are made in real time to dynamically adjust the modulation as the line quality over various subchannels changes during use. By way of example, a suitable discrete multi-tone modulator is described in the same ATIS standard.

After the encoded signal has been modulated to form a discrete multi-tone signal, a cyclic prefix is appended to the discrete multi-tone encoded signal. The cyclic prefix is used primarily to simplify the demodulation of the discrete multi-tone signals. In the ATIS standard, a 32 bit cyclic prefix is used. However, with the larger bandwidth of the described embodiment, it would be preferable to double the length of the cyclic prefix as well. The transmitter also includes a line driver 28 which applies the discrete multi-tone signal to the communication line 40, which may take the form of a twisted pair phone line. Of course, other conventional communications lines can be used as well. Twisted pair lines are of particular interest due to their wide spread use in installed communication systems.

The discrete multi-tone encoded signal with its cyclic prefix is then transmitted over the communication line 29 to a remote location. In the described 512 subchannel embodiment, the discrete multi-tone signal has a total available bandwidth of approximately 2.208 MHz. In one embodiment, the transmitter is located at a central office in a telephone carrier service area and the communication line is a twisted pair channel. In other embodiments different communication lines may be used.

The signal is then received by a receiver 30 located at a remote location. The receiver has an analog filter 32, a time domain equalizer 38 (TEQ), a demodulator 31 that demodulates the equalized discrete multi-tone signal and strips the cyclic prefix, and a decoder 33 that decodes the demodulated signal. The demodulator 31 and the decoder 33 perform inverse functions of the modulator 25 and encoder 23 respectively. The decoded signal is then passed from the decoder 33 to a remote unit 36 such as a television, a computer, or other suitable receiving apparatus. The function of the time domain equalizer, the demodulator 31 and the decoder 33, as well as algorithms suitable for accomplishing the desired functions are all described in more detail in Chow et al.'s U.S. Pat. No. 5,285,474 which is incorporated herein by reference.

The upstream encoding and modulation may be done in exactly the same manner as the described downstream data transmission. However, in the described embodiment, just 64 subchannels are made available to upstream communications. However, it should be appreciated that any number of subchannels could be made available for such upstream communications.

In several of the described embodiments, the subchannel bandwidth has been considered fixed. However, in some applications, it may be desirable to provide a mechanism for dynamically adjusting the bandwidth of the subchannels in unison. In such systems, the data transmission rates obtainable by a fixed number of subchannels may be increased merely by broadening the subchannel bandwidth. For example, one representative system may include 256 subchannels each of which has a bandwidth that may be varied in the range of 4.3125 kHz–34.5 kHz. Of course, the actual ranges may be widely varied in accordance with the needs of a particular system. In one such arrangement, the system may initially be set up to operate with the subchannels widths each being at the minimum width. Then, as the system's load increases, the subchannel widths may be gradually adjusted as required to handle the in increasing data transmission requirements. Typically, the bandwidth increasing step would be taken only infrequently and treated as a system upgrade. In other embodiments, the bandwidth may be dynamically increased and decreased to meet the current data transmission needs of the system.

Although only a few embodiments of the present invention have been described herein, it should be understood that the present invention may be embodied in many other specific forms without departing from the spirit or scope of the invention. Particularly, the invention has been described in terms of an embodiment that is backwards compatible with the proposed ATIS North American Asymmetric Digital Subscriber Line Standard. However, it should be appreciated that the invention is equally applicable to discrete multi-tone data transmission schemes that are symmetric as well as asymmetric. Further, the invention is in no way limited to transmission schemes having the specific subchannel widths used in the described embodiments. Rather, it may readily be applied to a broad range of transmission schemes. The point is that data can be reliably transmitted over telephone lines in subchannels located at higher frequencies then was previously believed to be possible. Further, the actual number of subchannels that are available may be widely varied in accordance with the needs of a particular system. Often, it is desirable from an efficiency standpoint to define the total number of available subchannels as a integer power of two. However, this is not in any way a requirement. In view of the foregoing, the present examples are to be considered as illustrative and not restrictive, and the invention is not to be limited to the details given herein, but may be modified within the scope of the appended claims.

I claim:

1. A discrete multi-tone transmitter that is suitable for transmitting digital data over a twisted pair communication line on a multiplicity of subcarriers having different frequencies, the transmitter comprising:

an encoder for encoding digital information, the encoder being capable of encoding digital information at speeds in excess of six megabits per second;

a monitor for monitoring a communication line to determine line quality parameters indicative of noise levels at each of a multiplicity of subchannels, each subchannel corresponding in frequency to an associated subcarrier;

a modulator for modulating the encoded digital information onto a multiplicity of subcarriers in a discrete multi-tone signal, each subcarrier corresponding to an associated tone and an associated subchannel, wherein the available subcarriers for the discrete multi-tone encoded signal have a combined bandwidth of at least 1.6 MHz, the modulation being arranged to take into consideration at least the detected line quality parameters and a permissible power mask parameter, and wherein the modulation is capable of dynamic updating both the subchannels used and the amount of data transmitted on each subchannel during transmission in order to accommodate real time changes in specific parameters; and an adder for appending a cyclic prefix to the discrete multi-tone signal before it is applied to the transmission line.

2. A transmitter as recited in claim 1 wherein the modulator modulates the encoded digital information onto subcarriers that correspond to subchannels that each have a bandwidth that is in the range of approximately 4.3125 kHz to 34.5 kHz wide.

3. A transmitter as recited in claim 2 wherein the modulator is arranged to modulate the encoded digital information onto subcarriers that correspond to subchannels that have variable widths.

4. A transmitter as recited in either claim 1 wherein the modulator is capable of transmitting information on at least 512 separate subchannels.

5. A transmitter as recited in claim 4 wherein the transmitter may also be used in a standard mode that utilizes a maximum of the lower 256 subchannels and is compatible with the ATIS North American Asymmetric Digital Subscriber Lines standard.

6. A transmitter as recited in claim 1 wherein the monitor is capable of detecting significant line noise and interference, and when noise is detected by the monitor, the modulator is arranged to transmit the encoded digital information at frequencies above and below the most significant noise to facilitate transmission of the encoded digital data throughout a carrier service area at data rates of at least six million bits per second (6 Mbps).

7. A transmitter as recited in claim 1 that is capable of transmitting the encoded digital information to a remote location that is up to 2000 meters from the transmitter, at a rate of at least ten million bits per second (10 Mbps) over a communication line that takes the form of a twisted pair phone line.

8. A discrete multi-tone receiver for receiving a first set of multi-tone encoded digital information over a communication line that may take the form of a twisted pair communication line, the receiver comprising:

a demodulator for demodulating the encoded digital information from a multiplicity of subcarriers in a discrete multi-tone signal at data rates in excess of six megabits per second, each subcarrier corresponding to an associated tone and an associated subchannel, wherein the available subcarriers for the discrete multi-tone encoded signal have a combined bandwidth of at least 8.8 MHz, the demodulation being arranged to receive modulation information as part of the discrete multi-tone signal, wherein the demodulator is capable of dynamic updating during reception in response to changed modulation information in order to accommodate real time changes in the modulation scheme, the demodulator being arranged to strip the cyclic prefix from the discrete multi-tone signal;

a decoder for decoding the demodulated digital information in real time;

an encoder for encoding a second set of digital information; and a modulator for modulating the encoded second set of digital information onto a multiplicity of subcarriers in a second discrete multi-tone signal, each subcarrier in the second discrete multi-tone signal corresponding to an associated tone and an associated subchannel, wherein the available subcarriers for the second discrete multi-tone encoded signal have a combined bandwidth that is significantly less than the bandwidth of the subcarriers that are available to the first discrete multi-tone encoded signal.

9. A receiver as recited in claim 8 wherein the second discrete multi-tone encoded signal has up to sixty four separate subcarriers and is transmitted over the communication line to a source.

10. A receiver as recited in claim 8 wherein the demodulator further includes a time domain equalizer.

11. A method of transmitting digital information from a source over a potentially noisy communication line that may take the form of a twisted pair communication line using a discrete multi-tone transmission scheme having a multiplicity of tones wherein the digital information is encoded and modulated onto a multiplicity of subcarriers, each subcarrier corresponding to an associated tone, the method comprising the steps of:

monitoring the communication line to determine at least one line quality parameter indicative of noise levels at each of a multiplicity of subchannels that correspond to associated ones of said tones;

encoding a digital data stream;

forming a discrete multi-tone encoded signal from the encoded digital data stream using a discrete multi-tone modulator, wherein the available subcarriers for the discrete multi-tone encoded signal have a combined bandwidth of at least 8.8 MHz, the encoding and modulation being arranged to take into consideration the detected line quality parameters, and a permissible power mask parameter, and wherein the modulation system is capable of dynamically updating both the subchannels used and the data transmission rate over each subchannel used during transmission in order to accommodate real time changes in specific parameters;

appending a cyclic prefix to the discrete multi-tone encoded signal;

transmitting the discrete multi-tone encoded signal and its cyclic prefix over the communication line to a remote location.

12. A method as recited in claim 11 further comprising the steps of receiving the signal at the remote location and demodulating and decoding the signal received at the remote location.

13. A method as recited in claim 1 wherein the tones each have a bandwidth that is at least approximately 4.3125 kHz wide.

14. A method as recited in claim 13 wherein up to 512 tones may be utilized to facilitate the use of a bandwidth of at least approximately 2.208 MHz.

15. A method as recited in claim 11 wherein the multi-tone encoding is done in substantial compliance with the ATIS Asymmetric Digital Subscriber Lines standard and wherein the subchannels that occur at frequencies above those set forth in the standard are treated similarly to those within the standard range in terms of subcarrier selection criteria.

16. A method as recited in claim 11 wherein when significant noise or interference is detected during said monitoring step, the modulator is arranged to transmit the data at frequencies above and below the most significant noise or interference to facilitate transmission of the encoded digital data throughout a carrier service area.

17. A method as recited in claim 16 wherein the data transmission rate over twisted pair communication lines may be at least ten million bits per second (10 Mbps) at distances of up to 2000 meters even in the presence of T1 noise.

18. A method as recited in claim 11 wherein the communication line is a twisted pair phone line, the remote location may be up to 1500 meters from the transmitter, and the digital data may be transmitted at a rate of at least twenty five million bits per second (25 Mbps).

19. A method as recited in claim 13 further comprising the steps of encoding and modulating a second set of data at the remote location and transmitting the second set of data over the communication line back to the source on a second discrete multi-tone signal having up to sixty four separate tones.

20. A method as recited in claim 18 wherein the digital data in the second set of data is transmitted at a data transmission rate of at least 1.544 million bits per second.

\* \* \* \* \*